United States Patent
Schaible et al.

[11] Patent Number: 5,897,124
[45] Date of Patent: Apr. 27, 1999

[54] PIVOT BEARING UNIT FOR A VEHICLE WHEEL ASSEMBLY

[75] Inventors: Walter Schaible, Hemmingen; Francesco Germano, Bietigheim-Bissingen, both of Germany

[73] Assignee: Dr. Ing.h.c.F. Porsche AG, Weissach, Germany

[21] Appl. No.: 08/813,782

[22] Filed: Mar. 7, 1997

[30] Foreign Application Priority Data

Mar. 7, 1996 [DE] Germany .............................. 196 08 788

[51] Int. Cl.$^6$ .............................. B60G 3/00; B62D 7/18
[52] U.S. Cl. .......................... 280/124.146; 280/124.154; 280/93.512
[58] Field of Search ...................... 280/96.1, 660, 280/663, 668, 673, 674, 691, 696, 93.512, 124.145, 124.146, 124.154, 124.125

[56] References Cited

U.S. PATENT DOCUMENTS

| | | | |
|---|---|---|---|
| 2,173,973 | 9/1939 | Leighton | 280/674 |
| 2,435,814 | 2/1948 | Allison | 280/96.1 |
| 3,147,026 | 9/1964 | Schilberg | 280/673 |
| 3,749,415 | 7/1973 | Sampatacos | 280/96.1 |
| 4,491,340 | 1/1985 | Von Grüberg et al. | 280/668 |
| 4,618,159 | 10/1986 | Kozyra et al. | 280/96.1 |
| 4,761,018 | 8/1988 | Abbruzzi et al. | 280/674 |
| 4,761,019 | 8/1988 | Dubensky | 280/674 |
| 5,145,204 | 9/1992 | Perkins | 280/668 |
| 5,366,233 | 11/1994 | Kozyra et al. | 280/96.1 |

FOREIGN PATENT DOCUMENTS

| | | | |
|---|---|---|---|
| 0108041 | 5/1984 | European Pat. Off. | |
| 1120633 | 7/1956 | France | 280/674 |
| 1185602 | 8/1959 | France | 280/673 |
| 2918562A4 | 11/1979 | Germany | |
| 4313624AP | 11/1993 | Germany | |
| 56-75270 | 6/1981 | Japan | 280/96.1 |
| 56-82668 | 7/1981 | Japan | 280/96.1 |
| 5-112111 | 5/1993 | Japan | 280/673 |
| 315 496 | 9/1956 | Switzerland | |
| 2020235 | 11/1979 | United Kingdom | |

OTHER PUBLICATIONS

German Patent Office Search Report, Application No. 196 08 788.0, dated Dec. 11, 1996.
European Patent Office Search Report, Application No. 97102493.0, dated Jul. 7, 1997.

*Primary Examiner*—Peter C. English
*Attorney, Agent, or Firm*—Evenson McKeown Edwards & Lenahan, PLLC

[57] ABSTRACT

A pivot bearing unit consists of at least one support comprising two shell parts for receiving individually insertable steering links. The support includes a section with the shell parts abutting one another and forming a bearing for a damping strut. The shell parts include a further pair of respective abutting surfaces which form a bearing support for a brake caliper. The shell parts also have respective spaced apart sections for supporting a central pin, which in turn accommodates a brake disc and wheel.

24 Claims, 8 Drawing Sheets

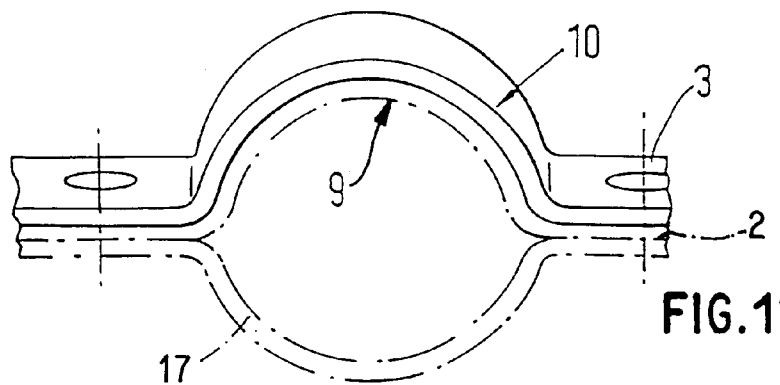
FIG. 11
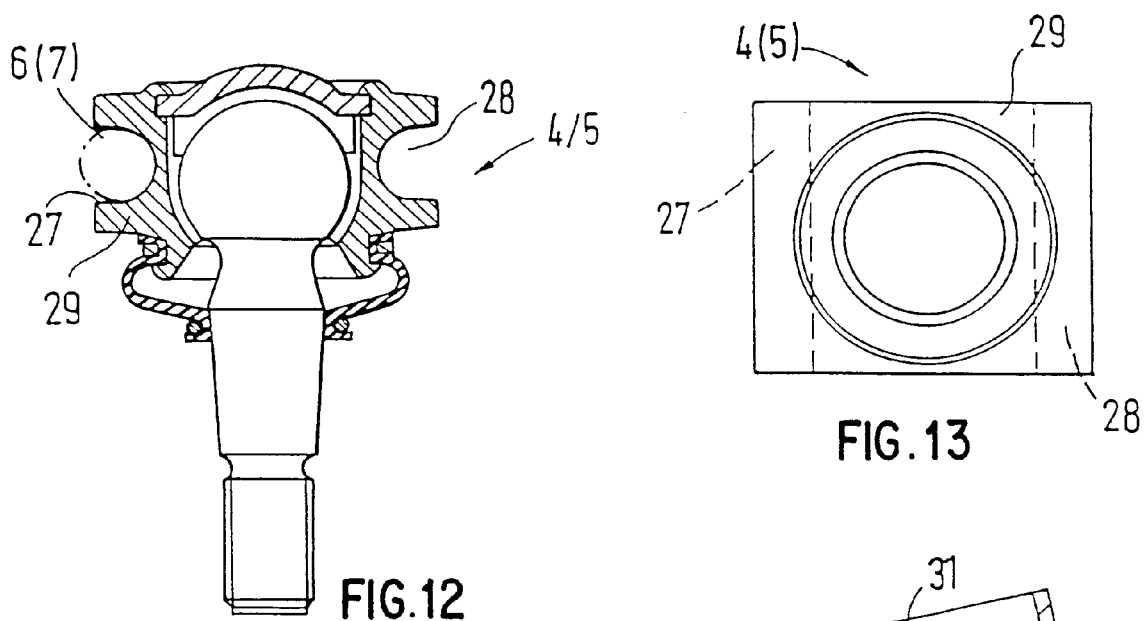
FIG. 12
FIG. 13
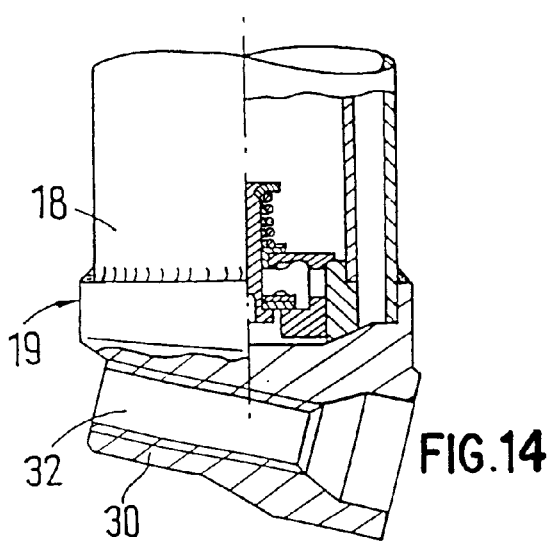
FIG. 14
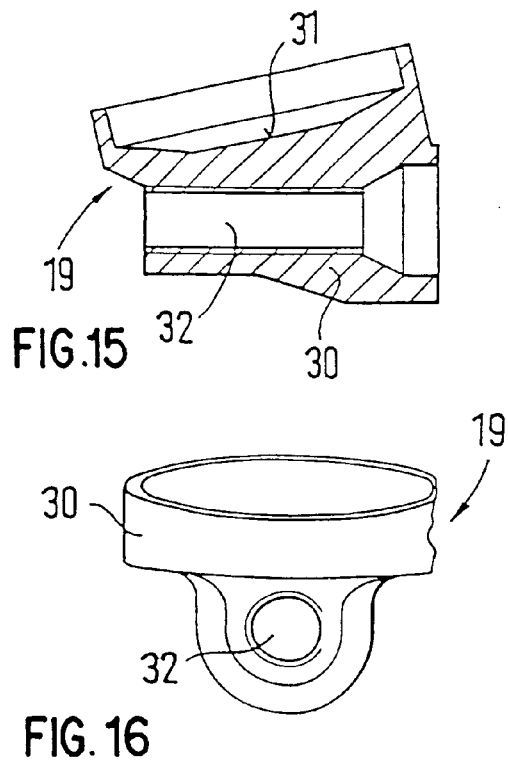
FIG. 15
FIG. 16

PIVOT BEARING UNIT FOR A VEHICLE WHEEL ASSEMBLY

BACKGROUND OF THE INVENTION

This application claims the priority of German application number 196 08 788.0 filed on Mar. 7, 1996, the disclosure of which is expressly incorporated by reference herein.

The invention relates to a pivot bearing unit composed of plural shell parts.

A pivot bearing unit is known from British Patent 20 20 235 A that consists of two shaped shell parts connected together by a weld. A central pin is held in these shell parts, and bearing bores are provided to receive a suspension strut. The shell parts are inserted into one another and have flat supports in the marginal area where a connecting weld is also located.

SUMMARY OF THE INVENTION

A goal of the invention is to provide a pivot bearing unit that functionally reliably receives a damper strut as well as a brake unit and wheel bearing as well as a pitman shaft, and provides a pivotable bearing for the suspension links of a steering system. The pivot bearing unit should also be simple to manufacture and install.

This goal is achieved according to the invention by providing a bearing unit for a vehicle wheel assembly of the type including a central pin for a vehicle wheel bearing, a steering link member and a damping strut, said bearing unit including first and second shell parts facing one another and including spaced part steering link member support sections which in use support the steering link member therebetween, central pin support sections supporting the central pin, and damping strut support sections which form a bearing support for the damping strut.

Primary advantages achieved by the invention consist in the fact that the two shell parts forming the pivot bearing unit can be manufactured in simple fashion, for example by stamping in a shaping tool with all of the bores, recesses, and the like being includable therein. The shell parts can consist of sheet steel, light sheet metal, or castings.

The shell parts are profiled in such fashion that they meet the strength requirements and also permit mounting the damper strut as simply as possible by receiving the steering links, and holding the brake caliper in an advantageous fashion. In addition, a bearing is held in place by a central pin passing through the shell parts on which bearing the brake disc is secured by a wheel hub.

The two shell parts are expanded (effectively thickened) by stacked supporting surfaces in the vicinity of the bearing of the brake caliper and the receptacle for the damper strut and by adjoining spaced surfaces in the vicinity of the steering links and central pin. As a result, high resistance torques are advantageously obtained in areas exposed to relatively high stresses so that the lateral and braking forces acting on the wheel can be accepted optimally without bending or deformation of the shell parts.

The external shell part has a pot-shaped indentation around the central pin, while the edges, which are raised around the rim, are partially offset and provided with a bent edge. A semicircular indentation is provided in the upper edge that is designed to match an indentation on the edge of the inside shell part and in which the damper strut is received to support it, with the lower free end abutting the central pin through a bearing element. The area of the two shell parts that adjoins the shaped parts is designed with a cross section approximately in the shape of a Z up to the area where a first steering link is located.

The damper strut is secured to the shell parts in the indentations by means of a clamping shell mounted by bolts to the shell parts.

The internal shell part has an indentation that is approximately U-shaped in cross section to hold the brake caliper, said indentation fitting into the external shell part to permit rigid and stable mounting of the brake caliper on the two shell parts.

The receiving locations for the steering links in the two shell parts are provided below and above the central pin, with a third steering link possibly being provided instead of the receptacle for the damping strut. The damping strut is then supported differently on the wheel suspension.

The steering links between the two shell parts hold the latter at a distance from one another. The steering links are provided with a receiving element that has grooves to receive the mounting bolts on opposite side edges and holds the steering link in place.

The steering link unit, consisting of the damping strut, brake, and steering links and a wheel bearing for a wheel suspension can be preassembled in simple fashion. This applies to the entire unit, with left-hand and right-hand pivot bearing units as well as a wheel suspension so that it can be installed rapidly and economically in a vehicle.

Other objects, advantages and novel features of the present invention will become apparent from the following detailed description of the invention when considered in conjunction with the accompanying drawings.

BRIEF DESCRIPTION OF THE DRAWINGS

FIG. 11 is a view of an upper receptacle for the damping strut viewed in the direction of arrow Z in FIG. 1;

FIG. 12 is a section through a steering link with the receiving element, for use with the pivot bearing unit shown assembled in FIG. 17;

FIG. 13 is a top view of the receiving element of FIG. 12;

FIG. 14 is a part sectional view of a lower bearing element on the damping strut with a connection to the central pin of the assembly shown in FIG. 17;

FIG. 15 is a section through the bearing element of FIG. 14;

FIG. 16 is a partial view of the bearing element of FIGS. 14 and 15;

DETAILED DESCRIPTION OF THE DRAWINGS

Figure 1:
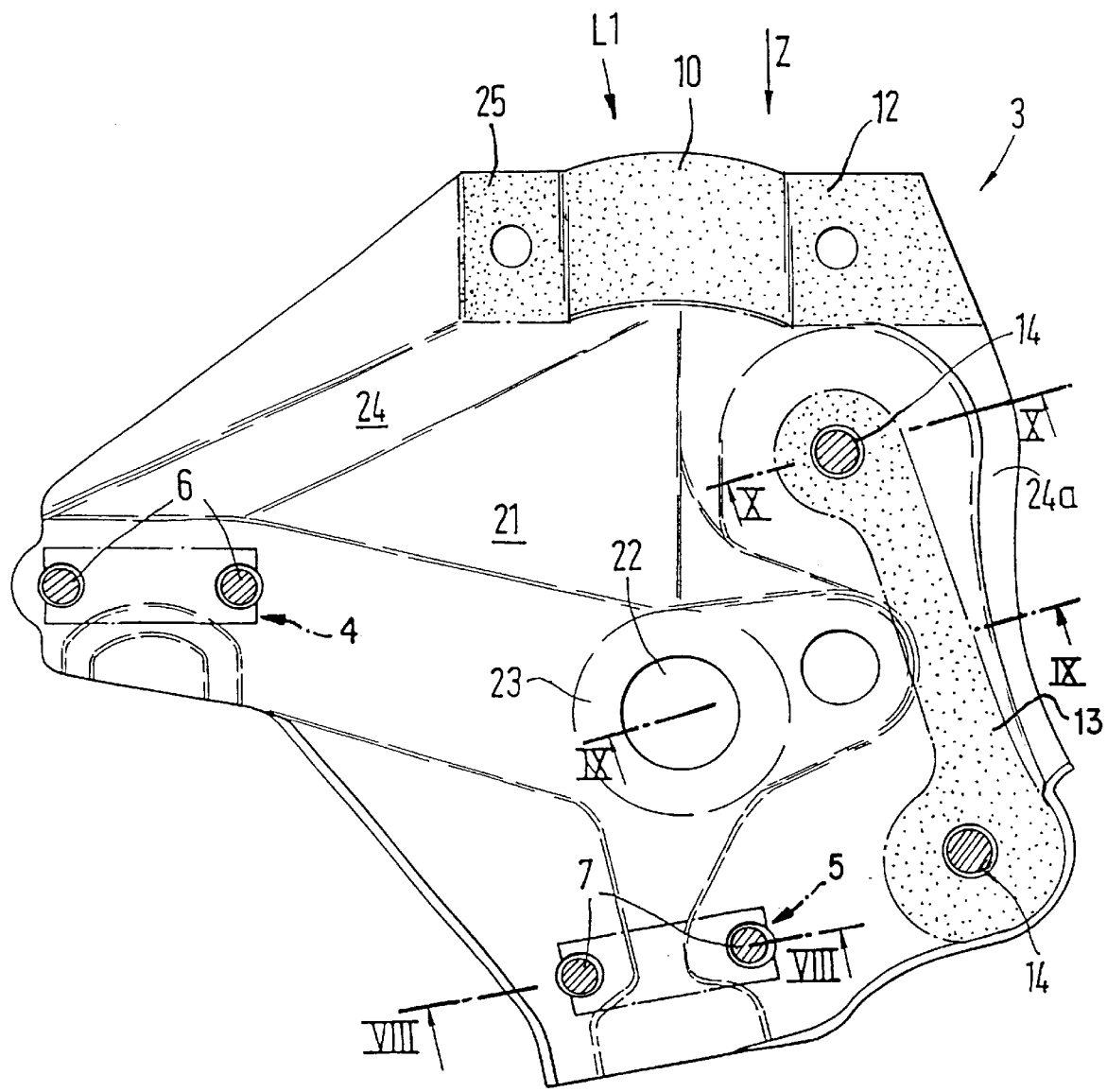
FIG. 1 is a plan view of an outside shell part viewed from its side facing the inside shell part in an assembled condition as shown in FIG. 17, constructed according to a preferred embodiment of the present invention.
Figure 2:
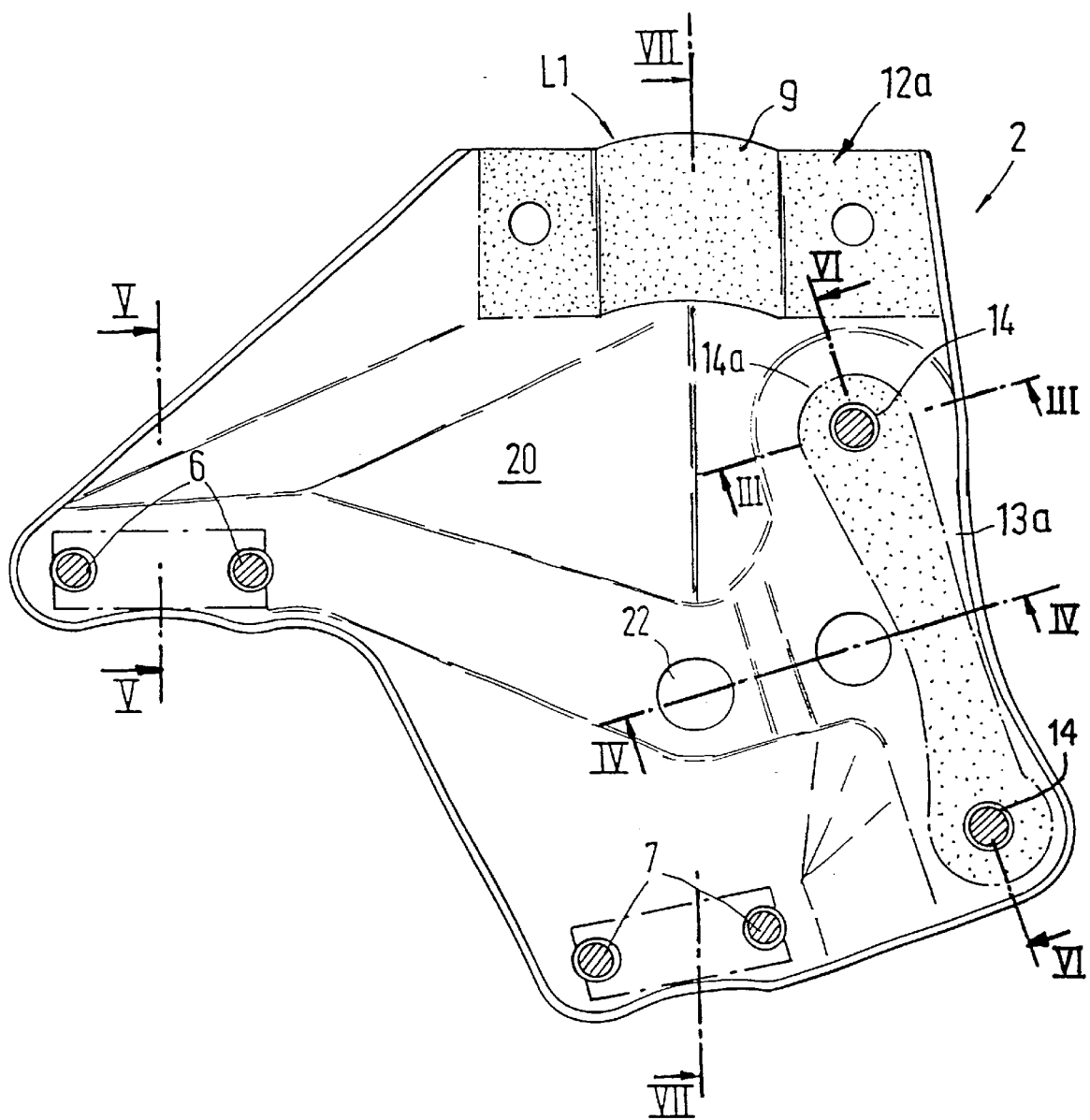
FIG. 2 is a plan view of an inside shell part viewed from its side facing the outside shell part in an assembled condition as shown in FIG. 17, but shown in reverse mirror image, constructed according to a preferred embodiment of the present invention.

Pivot bearing unit 1 comprises an internal shell part 2 (FIG. 2) and an external shell part 3 (FIG. 1). These shell parts 2 and 3 are connected together by mounting bolts 6, 7 with interposition of steering links 4, 5. To provide a bearing for a damping strut 8, shell parts 2, 3 are provided with shaped receptacles 9, 10 and with a central pin 11 that abuts the lower free end of the damper strut.

Figure 17:
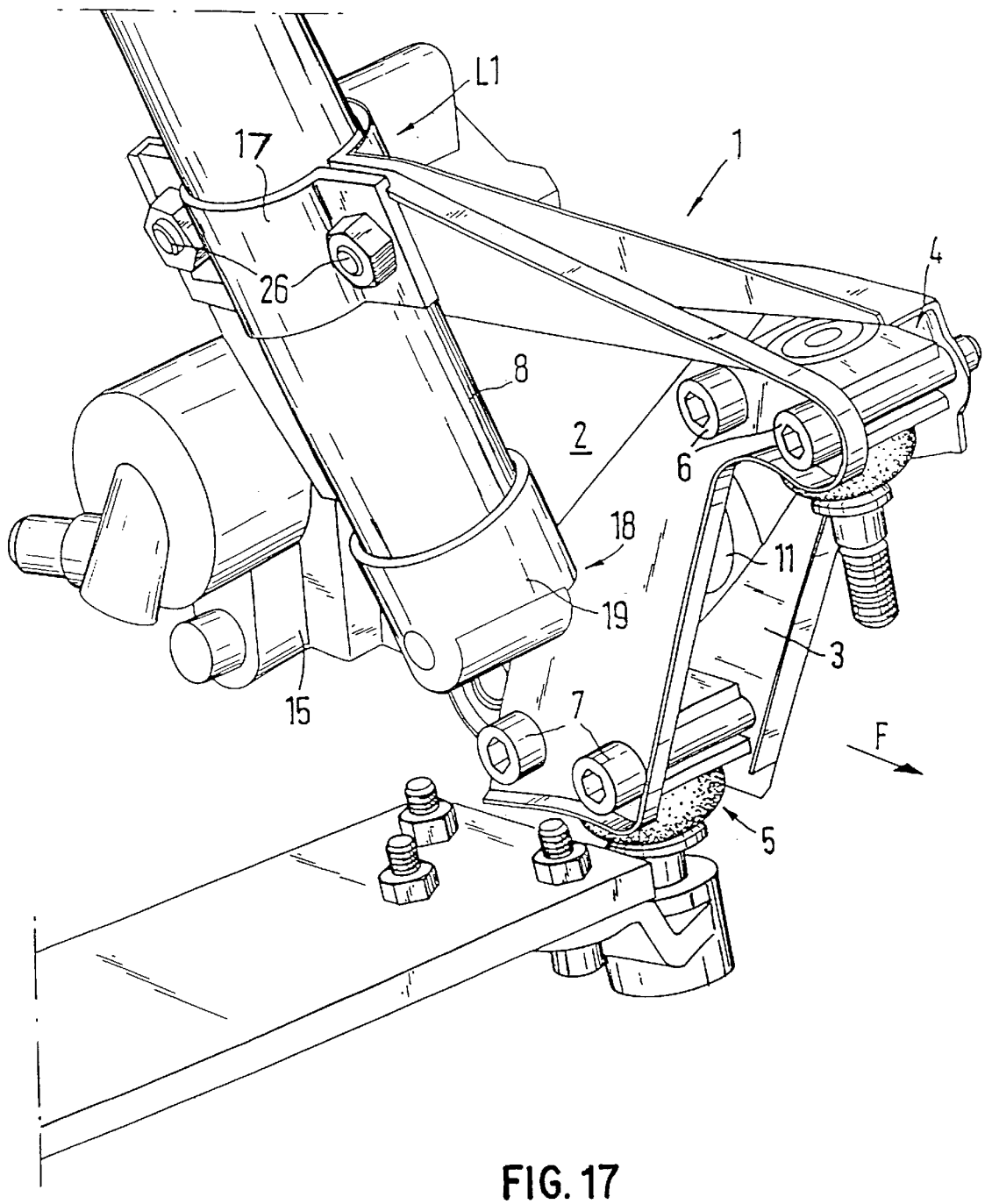
FIG. 17 is a schematic drawing of the assembled shell parts with the steering links and connected damping strut.
Figure 18:
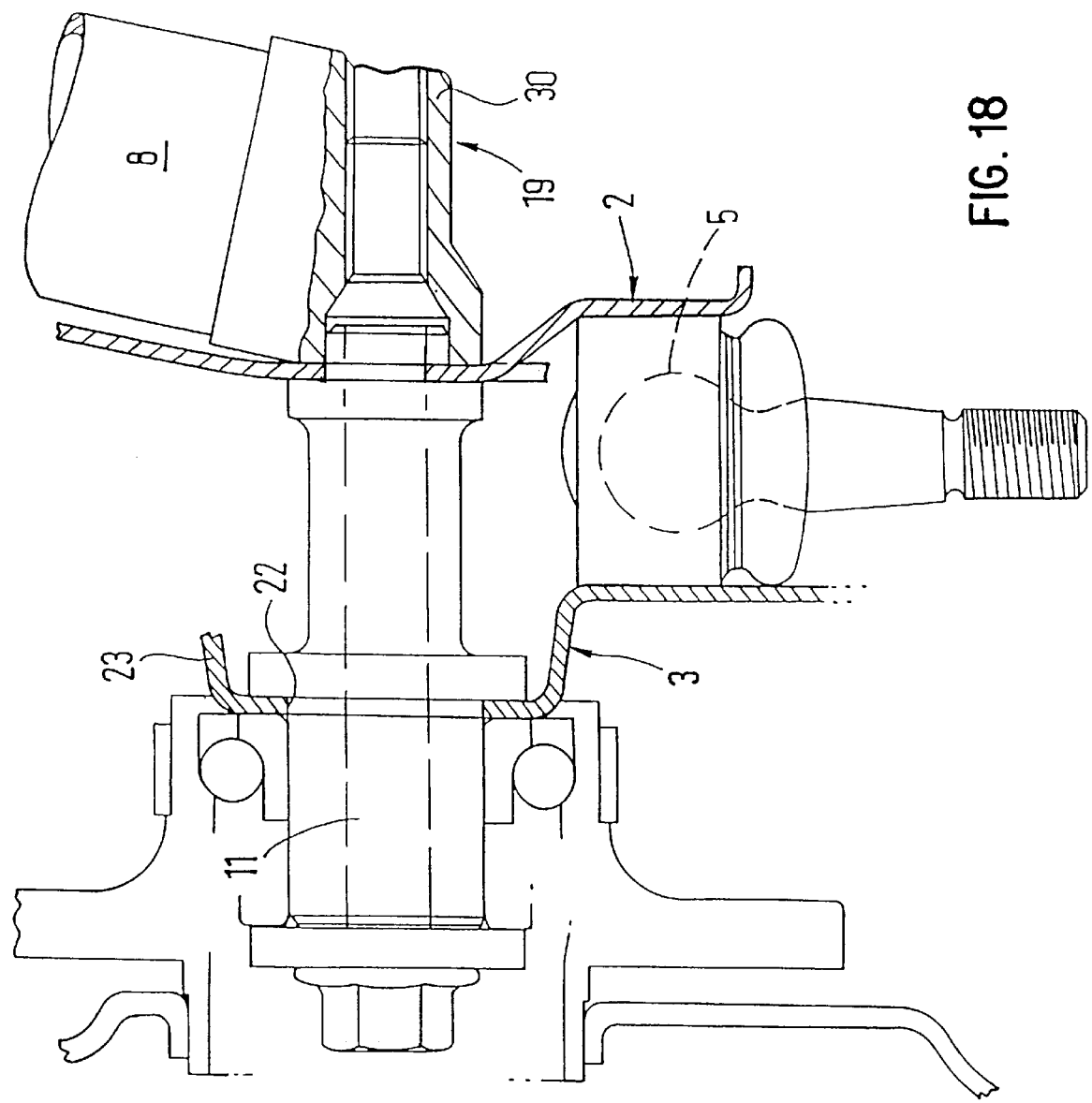
FIG. 18 is a part sectional schematic view of the shell parts in an assembled state, as shown in FIG. 17, showing the lower steering link, damping strut, and the central pin.

Shell parts 2, 3 are profiled and have indentations of various depths toward the center of the wheel. In the assembled state (FIGS. 17 and 18), shell parts 2, 3 abut one another flush in partial areas 12, 12a and 13, 13a while in adjoining partial areas 20, 21 shell parts 2, 3 are arranged with spaces between them so that an intermediate space is created in these areas.

Figure 10:
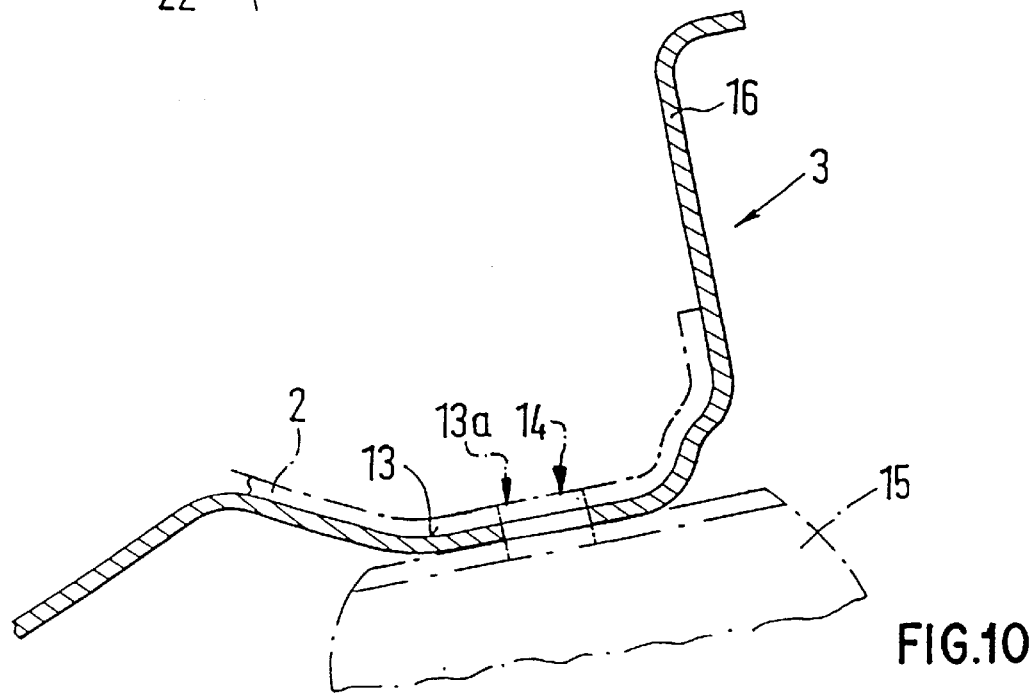
FIG. 10 is a cross section through the external shell part in the vicinity of the stacked surfaces along line X—X in FIG. 1 on an enlarged scale.

Thus the partial areas 13, 13a of the two shell parts 2, 3 form a bearing section that extends approximately vertically and serves to fasten a brake caliper 15. Mounting is by means of mounting bolts 14a provided in bores 14. As described in greater detail in FIG. 10, area 13 of shell part 3 has an approximately U-shaped cross section into which matching area 13a of internal shell part 2 fits and brake caliper 15 is then mounted externally. Then shell part 3 is extended by a leg 16 in area 13 and said leg is then bent at an angle. Spacers can also be provided between shell parts 2, 3 in areas 13, 13a.

Figure 3:
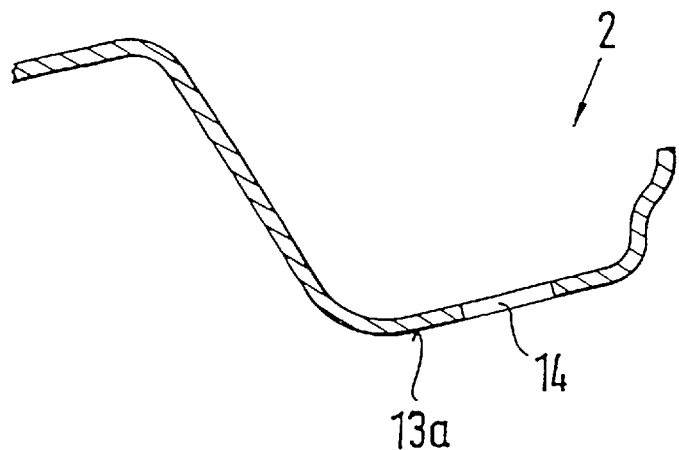
FIG. 3 is a cross section through the internal shell part in the vicinity of the stacked surfaces along line III—III in FIG. 2 on an enlarged scale.
Figure 4:
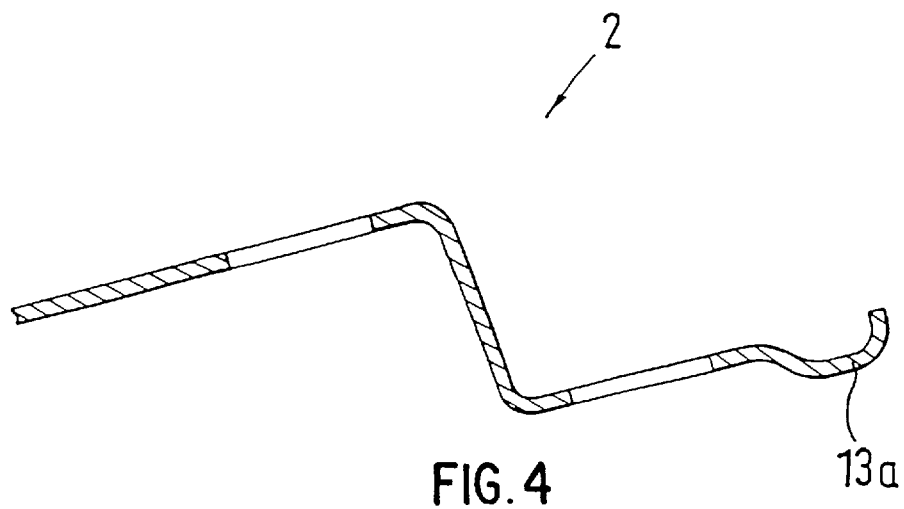
FIG. 4 is a cross section through the internal shell part in a central area of the stacked surfaces along line IV—IV in FIG. 2 on an enlarged scale.
Figure 5:
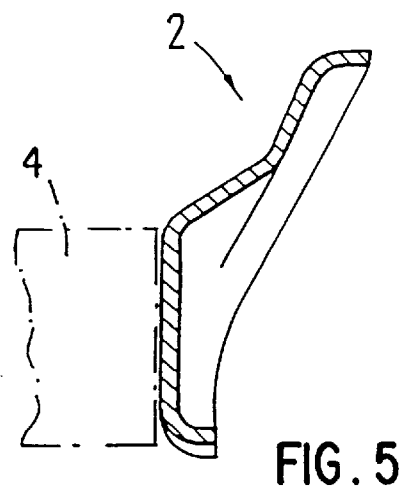
FIG. 5 is a cross section through the internal shell part in the vicinity of a steering link located in front in a vehicle travel direction, shown along line V—V in FIG. 2 on an enlarged scale.
Figure 6:
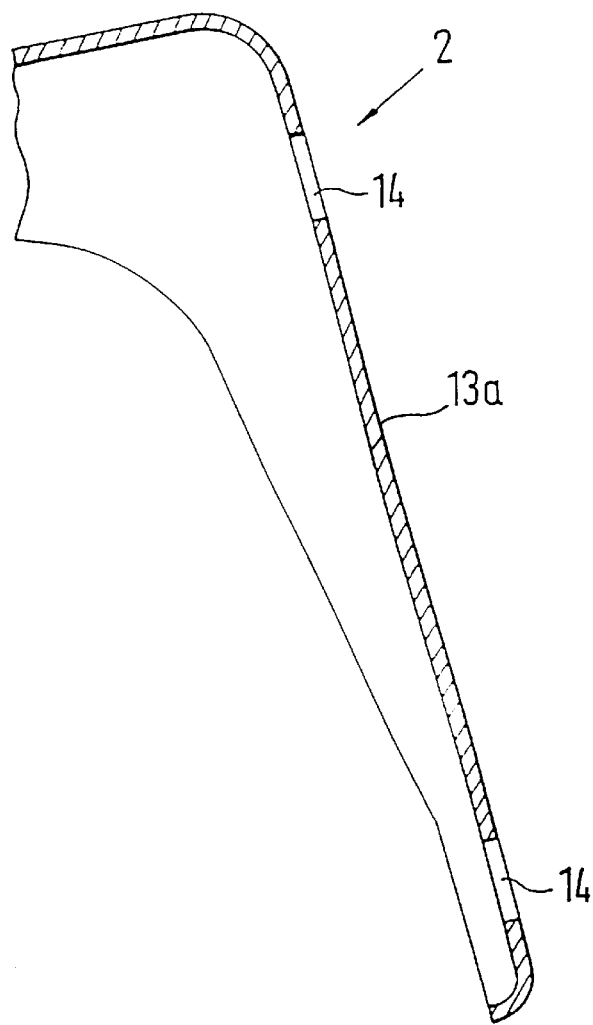
FIG. 6 is a lengthwise section through the internal shell in the vicinity of the stacked surfaces along line VI—VI of FIG. 2 on an enlarged scale.
Figure 7:
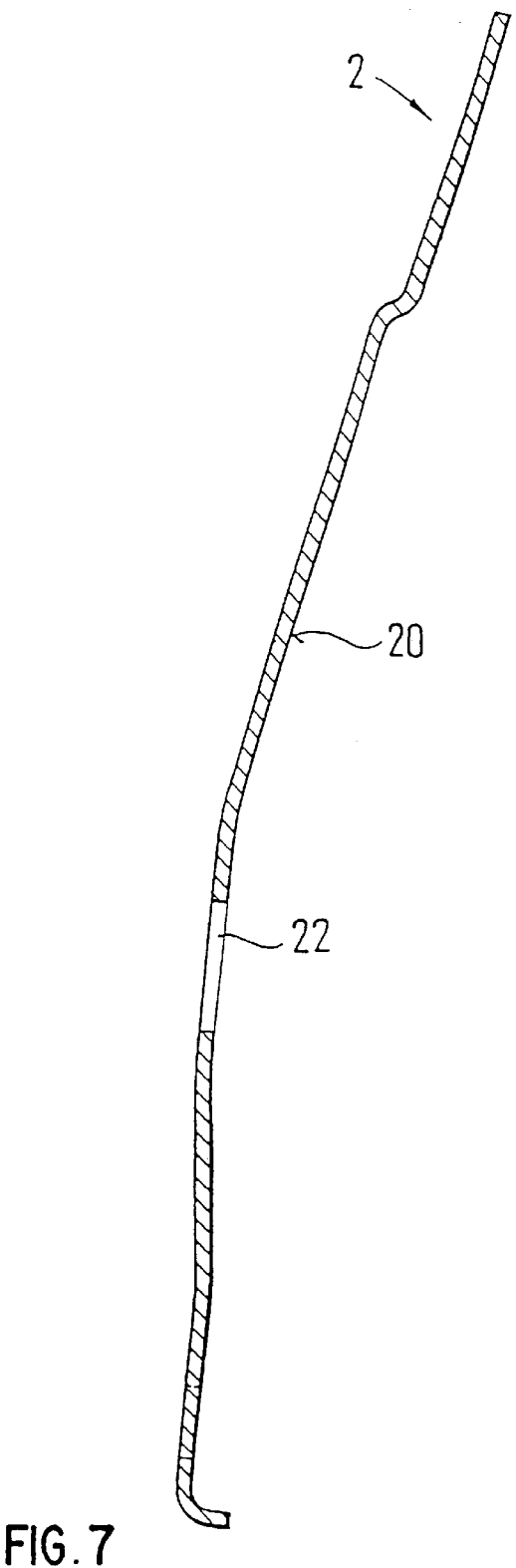
FIG. 7 shows a section through the internal shell part in the vicinity of the receptacle for a damping strut along line VII—VII of FIG. 2 on an enlarged scale.
Figure 8:
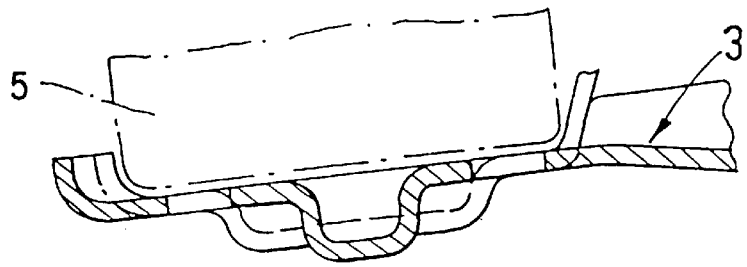
FIG. 8 is a cross section through the external shell part in the vicinity of a lower steering link, along line VIII—VIII in FIG. 1 on an enlarged scale.
Figure 9:
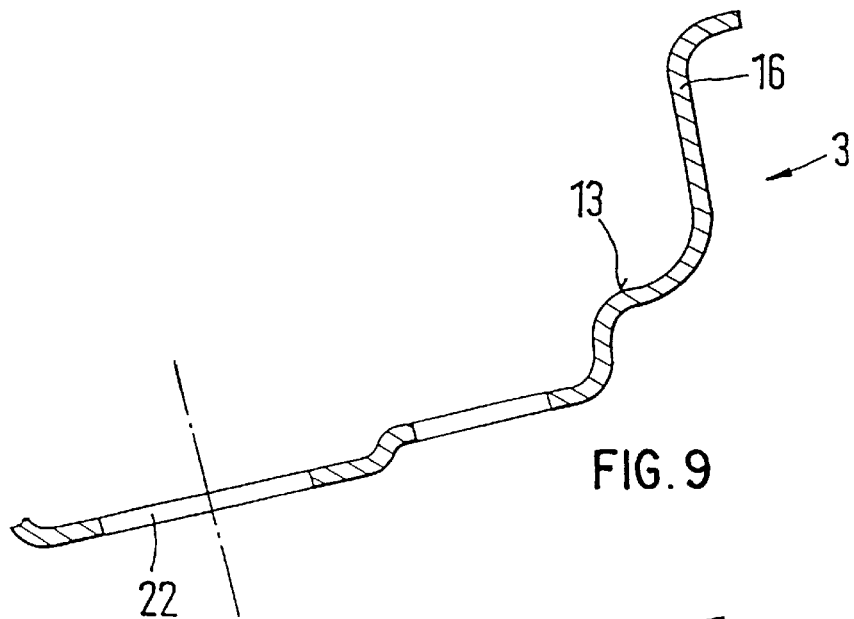
FIG. 9 shows a cross section through the external shell part in the vicinity of a central pin and of the stacked surfaces for the brake caliper along line IX—IX of FIG. 1 on an enlarged scale.

As shown in greater detail in FIG. 3 and drawn in FIG. 10 with dot-dashed lines, area 13a of shell part 2 fits into the hollow in shell part 3 and abuts matching area 13. In FIG. 4, a section corresponding to the section in FIG. 9 is indicated by shell part 2 from which the flush connection between shell parts 2, 3 in areas 13, 13a can be seen more closely.

Another approximately horizontal area 12, 12a with a mutually abutting arrangement is provided in formed section 9, 10 of shell parts 2 and 3. To provide a bearing L1 for damping strut 8, these sections 9, 10 fit into one another and the damping strut 8 is positioned exactly by a clamp 17 and fastened to shell parts 2 and 3. The lower end 18 of damping strut 8 is held in a bearing element 19 that abuts central pin 11.

The area that adjoins the corresponding section 9, 10 of the two shell parts 2, 3 up to an upper steering link 4 are made approximately Z-shaped in cross section. Steering links 4, 5 below and above central pin 11 are held between shell parts 2, 3 with upper steering link 4 being located in front of lower steering link 5 relative to the direction of travel F (FIG. 17) in an in use direction on a forward travelling vehicle.

The flat areas 12, 12a and 13, 13a that abut one another are adjoined by spaced areas 20, 21 of shell parts 2, 3. Thus, external shell part 3 has a pot-shaped indentation 23 around a receiving bore 22 for central pin 11. Internal shell part 2 has a corresponding bore 22. Shell part 3 is raised toward the outer edge and partially provided with offsets 24, 24a, and 25, with section 10 for damping strut 8 being provided in one offset 25.

The upper steering link 4 and lower steering link 5 are retained in the areas 20, 21 of the two shell parts 2, 3 that are spaced apart from one another. The two shell parts 2, 3 are clamped together by mounting bolts 14a and/or rivets for brake caliper 15 and bolts 26 on damping strut 8 as well as by bolts 6, 7 on steering links 4, 5 and by means of central pin 11.

It is also contemplated to connect the two shell parts 2, 3 by welding that supplements the bolted connections according to certain preferred embodiments. The arrangement of the two steering links 4, 5 is shown in greater detail in FIGS. 17 and 18. The weld consists of a spot weld in those areas of the shell parts that abut one another.

Steering links 4, 5 each comprise a receiving element 29 that has grooves 27, 28 on opposite lateral edges. Mounting bolts 6, 7 are retained in these grooves and hold receiving element 29 between them. Receiving element 29 is preferably made in the form of an extruded section.

Damping strut 8 is connected at lower end 18 with bearing element 19 made in the form of a sealing cap 30. This cap 30 has a depressed supporting surface 31 as well as a through hole 32, with a thread for central pin 11 for example. Cap 30 closes off the cylinder chamber of damping strut 8 in a sealing fashion. Through hole 32, depending on the inclination of damping strut 8, can be at an angle to surface 31.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Pivot bearing unit for a vehicle wheel assembly including a central pin for a vehicle wheel bearing, a steering link member and a damping strut, said bearing unit including first and second shell parts facing one another, said first and second shell parts including:

respective spaced apart steering link member support sections which support the steering link member therebetween, respective spaced apart central pin support sections supporting the central pin, and respective damping strut support sections which together form a bearing support for the damping strut.

2. Pivot bearing unit according to claim 1, wherein said first and second shell parts include brake caliper support sections which form a bearing support for a brake caliper assembly.

3. Pivot bearing unit according to claim 2, wherein said first and second shell parts include further spaced apart steering link member support sections which support a further steering link member therebetween.

4. Pivot bearing unit according to claim 3, wherein the steering link members are retained respectively below and above the central pin between the shell parts with the upper steering link member being located in front of the lower steering link member relative to a forward driving direction of travel of a vehicle with said bearing unit installed.

5. Pivot bearing unit according to claim 3, wherein the shell parts are shaped with a profile and have partial areas that abut one another flush as well as adjoining shell areas that are shaped with spaces between them.

6. Pivot bearing unit according to claim 5, wherein the shell parts rest flush on one another in the horizontal section as well as in a vertical section to provide the damping strut support sections and the brake caliper support sections.

7. Pivot bearing unit according to claim 6, wherein the first shell part is an external shell part which has an indentation around a receiving bore forming one of the central pin support sections, said first shell part having a raised portion toward an outer edge and partial offset sections including an offset section having a semicircular indentation forming one of the damping strut support sections.

8. Pivot bearing unit according to claim 7, wherein the two steering link members are located in spaced areas of the two shell parts forming said steering link member support sections connected to one another by means of threaded bolts.

9. Pivot bearing unit according to claim 8, wherein the second shell part is an internal shell part which has a semicylindrical indentation matching the semicylindrical indentation in the first shell part, said semicylindrical indentations together forming the damping strut support sections.

10. Pivot bearing unit according to claim 9, wherein the second shell part has an approximately U-shaped cross section in an area of receiving bores for the brake caliper assembly.

11. Pivot bearing unit according to claim 10, wherein the steering link members are retained respectively below and above the central pin between the shell parts with the upper steering link member being located in front of the lower steering link member relative to a forward driving direction of travel of a vehicle with said bearing unit installed.

12. Pivot bearing unit according to claim 11, wherein the steering link members each have a receiving element for a joint ball that has grooves in opposite side edges, and wherein mounting bolts are provided in the grooves for connecting the shell parts.

13. Pivot bearing unit according to claim 12, wherein the damping strut is connected at a lower free end with a sealing bearing element that has a receiving bore for the central pin.

14. Pivot bearing unit according to claim 2, wherein the shell parts rest flush on one another in a horizontal section as well as in a vertical section to provide the damping strut support sections and the brake caliper support sections.

15. Pivot bearing unit according to claim 1, wherein said first and second shell parts include further spaced apart steering link member support sections which support a further steering link member therebetween.

16. Pivot bearing unit according to claim 15, wherein the two steering link members are located in spaced areas of the two shell parts forming said steering link member support sections connected to one another by means of threaded bolts.

17. Pivot bearing unit according to claim 15, wherein the steering link members each have a receiving element for a joint ball that has grooves in opposite side edges, and wherein mounting bolts are provided in said grooves for connecting the shell parts.

18. Pivot bearing unit according to claim 1, wherein the shell parts are shaped with a profile and have partial areas that abut one another flush as well as adjoining shell areas that are shaped with spaces between them.

19. Pivot bearing unit according to claim 1, wherein the first shell part is an external shell part which has an indentation around a receiving bore forming one of the central pin support sections, said first shell part having a raised portion toward an outer edge and partial offset sections including an offset section having a semicircular indentation forming one of the damping strut support sections.

20. Pivot bearing unit according to claim 19, wherein the second shell part is an internal shell part which has a semicylindrical indentation matching the semicylindrical indentation in the first shell part, said semicylindrical indentations together forming the damping strut support sections.

21. Pivot bearing unit according to claim 20, wherein the second shell part has an approximately U-shaped cross section in an area of receiving bores for a brake caliper.

22. Pivot bearing unit according to claim 20, wherein areas that adjoin the matching indentations of the two shell parts to an upper steering link member are approximately Z-shaped in cross section.

23. Pivot bearing unit according to claim 1, wherein the damping strut is connected at a lower end with a sealing bearing element that has a bore receiving the central pin.

24. Pivot bearing unit according to claim 23, wherein the sealing bearing element forms a sealing cap for the damping strut that has a depressed supporting surface at an angle to the lengthwise axis of the bore.

* * * * *